United States Patent [19]

Hasl et al.

[11] Patent Number: 4,944,665
[45] Date of Patent: Jul. 31, 1990

[54] ROTARY ARM LABEL TRANSFER APPARATUS IN COMBINATION WITH MOLDING APPARATUS

[75] Inventors: Siegfried C. Hasl, 80 Liberty Corner, Warren, N.J. 07060; Charles J. Lisnet, Westport, Conn.

[73] Assignee: Siegfried C. Hassl, Warren, N.J.

[21] Appl. No.: 443,014

[22] Filed: Nov. 29, 1989

Related U.S. Application Data

[63] Continuation of Ser. No. 594,885, Mar. 23, 1984, abandoned, which is a continuation-in-part of Ser. No. 544,986, Oct. 24, 1983, abandoned.

[51] Int. Cl.$^5$ ............................................. B29C 49/24
[52] U.S. Cl. ..................................... 425/116; 271/95; 425/117; 425/126.1; 425/127; 425/129.1; 425/517
[58] Field of Search ................ 156/539, 556, 559, 566, 156/569, 570, 572, D3; 271/91, 93, 95, 49, 102, 131, 132; 114/125, 128; 264/509; 425/110–112, 116–117, 126.1, 127, 129.1, 506, 514, 517, 523, 540

[56] References Cited

U.S. PATENT DOCUMENTS

| | | | |
|---|---|---|---|
| 2,294,273 | 8/1942 | Buxbaum | 156/D31 |
| 3,292,209 | 12/1966 | Borkmann | 425/522 |
| 3,324,508 | 6/1967 | Dickinson | 425/522 |
| 4,355,967 | 10/1982 | Hellmer | 271/103 |
| 4,359,314 | 11/1982 | Hellmer | 271/103 |
| 4,418,906 | 12/1983 | Scott | 271/99 |
| 4,563,148 | 7/1986 | Hasl | 425/126.1 |
| 4,802,832 | 2/1989 | Shapler | 425/126.1 |
| 4,838,776 | 6/1989 | Hasl | 425/127 |
| 4,878,823 | 11/1989 | Blomquist | 425/126.1 |
| 4,880,368 | 11/1989 | Hasl | 425/126.1 |

*Primary Examiner*—Merrell C. Cashion, Jr.
*Attorney, Agent, or Firm*—Larson and Taylor

[57] ABSTRACT

A label transferring apparatus useable for in-mold label application. In a first embodiment, a transfer device is mounted on a pivotable radial arm and comprises two pairs of transfer heads mounted for rapid, reciprocal transverse movement. A stack of labels is supplied by corresponding two pairs of magazines located at a first radial position. The radial arm is positioned by a fluid actuated rack and pinion mechanism.

14 Claims, 3 Drawing Sheets

ROTARY ARM LABEL TRANSFER APPARATUS IN COMBINATION WITH MOLDING APPARATUS

CROSS-REFERENCE TO RELATED APPLICATIONS

This application is a continuation of application Ser. No. 594,885 filed Mar. 23, 1984, now abandoned, which is a continuation-in-part of Ser. No. 544,986 filed Oct. 24, 1983, now abandoned.

BACKGROUND OF THE INVENTION

The present invention relates to apparatus for providing a supply of labels and for transferring those labels to another location. In particular, the present invention relates to label transfer apparatus for picking up a label from a label supply means such as a magazine and transferring and depositing the label at a distal location, such as in the mold of a molding machine.

The present invention is also an improvement of the invention disclosed in application Ser. No. 544,986, now abandoned, by the same inventors, the application being incorporated herein by reference. That application also discusses the problems and disadvantages existing in the prior art label transferring apparatuses. However, those problems and disadvantages will be summarized herein for convenience.

It is known to apply a label to a plastic container that is made by blow molding by applying the label inside the mold. Previous arrangements for supplying the labels into the mold are depicted, for example, in the Dickinson U.S. Pat. No. 3,324,508, the Borkman U.S. Pat. No. 3,292,209, the two U.S. Hellmer U.S. Pat. Nos. 4,355,967 and 4,359,314, and the Hellmer et al U.S. Pat. No. 4,397,625. These references are discussed in the aforementioned patent application.

While the prior art does recognize the basic concept of supplying labels at one location and transferring those labels into an open mold at another location, the devices of the prior art suffer from certain disadvantages. Generally, the aforementioned patents disclose label transferring and applying machines having complex structures that are incapable of modification so as to permit their incorporation into conventional, installed mold machinery. Furthermore, the prior art devices do not permit very rapid, yet accurate transferring and positioning of the labels.

The successful, rapid and accurate positioning of a label inside the mold of a molding machine requires the interrelated, cooperative aspects of several components. Of particular importance is a transfer mechanism that is capable of positively and accurately removing a label from a label supply means, retaining the label during a transfer operation, and accurately, reliably depositing the label at the same location inside the mold. In addition, the transfer apparatus must have a reliable means for rapidly and accurately moving the transfer heads from a label supply means to the inside of a mold, and then retract to outside of the mold and return to the label supply means to continue the cycle.

The problems become even more difficult when the requirement is added that the label delivery apparatus must be designed with flexibility so that it can be incorporated into a number of different types of previously installed molding apparatuses. The requirement for component flexibility also means that the individual components must work separately and in combination in a variety of orientations and in a variety of machinery environments.

The critical interrelationships between the label pickup means and the label supplying means becomes even more important when high label transfer speed and accurate label positioning are required. Consistent accuracy can be achieved if the label transfer mechanism has a simplistic motion and it has to travel a minimal distance. In all of the devices of the aforementioned Dickinson, Borkman, Hellmer and Hellmer et al patents, there is a transverse component of movement between the transfer head and the label both at the moment of pickup of the label and at the moment of transfer of the label to the mold cavity. That transverse component of motion tends to "scuff" the label as it is being transferred, thereby possibly damaging the label and certainly minimizing the ability to perfectly position the label on the label transfer head and within the mold cavity. A simple motion of the transfer head is also dictated in order to permit the retrofitting of a label transfer mechanism to installed molding machines. Therefore, accuracy and speed of label transfer are increased with an increase in the simplicity of label pickup motion and distance of travel.

Hence, there exists a need for further improvements in apparatus for transferring labels from a label supply means to a mold such that the label can be accurately, yet rapidly transferred and positioned.

SUMMARY OF THE INVENTION

It is, therefore, a purpose of the present invention to provide a new and improved label pickup and transferring apparatus which overcomes the disadvantages and limitations that have existed in the prior art.

The present invention is especially adapted for use with molding machines and is particularly usable with blow molding machines. However, it will be understood that the present invention may also be applicable to other types of molding machines such as vacuum, deep draw plastic forming machines or injection molding machines.

More specifically, the present invention is specifically adapted to being incorporated into existing molding machines which, particularly, have mold halves that move away from each other to dispose of a formed item and to receive additional material, such as a new parison, after which the mold halves move together for the subsequent molding operations. The present invention utilizes the time and spacing when the mold halves are separated from each other for placement of labels into the mold halves. The particular embodiments of the invention depicted in this application relate more principally to the storage of labels and the pickup of those labels by a transfer head in preparation for subsequent delivery of the labels into the mold halves. However, the same motion of the apparatus for picking up a label is subsequently utilized by the apparatus for the deposition of the label into the mold halves.

The goals of the present invention are achieved through an embodiment thereof which will be described in greater detail below. Generally, however, the embodiment utilizes the concept of accurately positioning a label on a transfer head and rapidly moving the transfer head between mold halves during the short time that the mold halves are separated to discharge a molded article, and then rapidly depositing the labels in the mold cavities and withdrawing the head from the mold so that the molding process can be resumed. This is accomplished by utilizing a label transfer mechanism that moves essentially directly toward the labels or label application surfaces with a simple movement having an insignificant or no lateral component of motion.

A first embodiment of the present invention utilizes a pivotably mounted radial arm onto which a label transfer means having at least one label transfer head is mounted. Means are provided for pivoting the arm from a first radial position to a second radial position, which positions define a first plane of movement. Further means are provided for reciprocally moving the transfer head in a second plane that is substantially perpendicular to the first plane.

In a particular embodiment of the present invention, the radial arm is pivotably mounted at one end thereof and the label transfer means is rigidly mounted collinearly with the arm at the other end thereof.

In another particular embodiment of the present invention, a radial arm is pivotably mounted at a first end thereof and two, opposed label pickup heads oppositely mounted for opposite reciprocal movement are mounted at the other end of the radial arm. A label magazine is located at a first position that is spaced vertically below the pivot point and a mold machine having two spaced apart mold sections is mounted at a second position that is spaced horizontally from the pivot point. Thus, the transfer pickup heads enter the space between the mold sections from therebelow.

Hence, it is an object of the present invention to provide a new and improved label transferring apparatus usable for in-mold labeling.

It is still another object of the present invention to provide a new and improved label transferring apparatus which recognizes the overall blow molding cycle and utilizes different portions of the cycle to enhance the efficiency of the label transferring apparatus.

It is still another object of the present invention to provide a new and improved mechanism for direct, rapid movement of the label transfer heads from a first position in which a label can be picked up from a label storing means to a second position where the labels can be applied to the interior of a mold cavity.

It is still another object of the present invention to provide a new and improved mounting and pivoting means for pivoting a label transfer head between a label storing magazine to a central position between two spaced apart mold halves in a simple, direct line of motion.

It is still another object of the present invention to rapidly and reciprocally position and withdraw a label transfer means to and from the space between two spaced apart mold sections from a direction located arcuately below and to the side of the mold sections.

These and other objects of the present invention will become apparent from the detailed description to follow, taken together with the accompanying drawings.

BRIEF DESCRIPTION OF THE DRAWINGS

There follows a detailed description of preferred embodiments of the present invention which are to be read in light of the accompanying drawings wherein.

DETAILED DESCRIPTION OF THE PREFERRED EMBODIMENTS

There follows a detailed description of preferred embodiments of the present invention wherein like elements are represented by like numerals throughout the several views.

Figure 1:
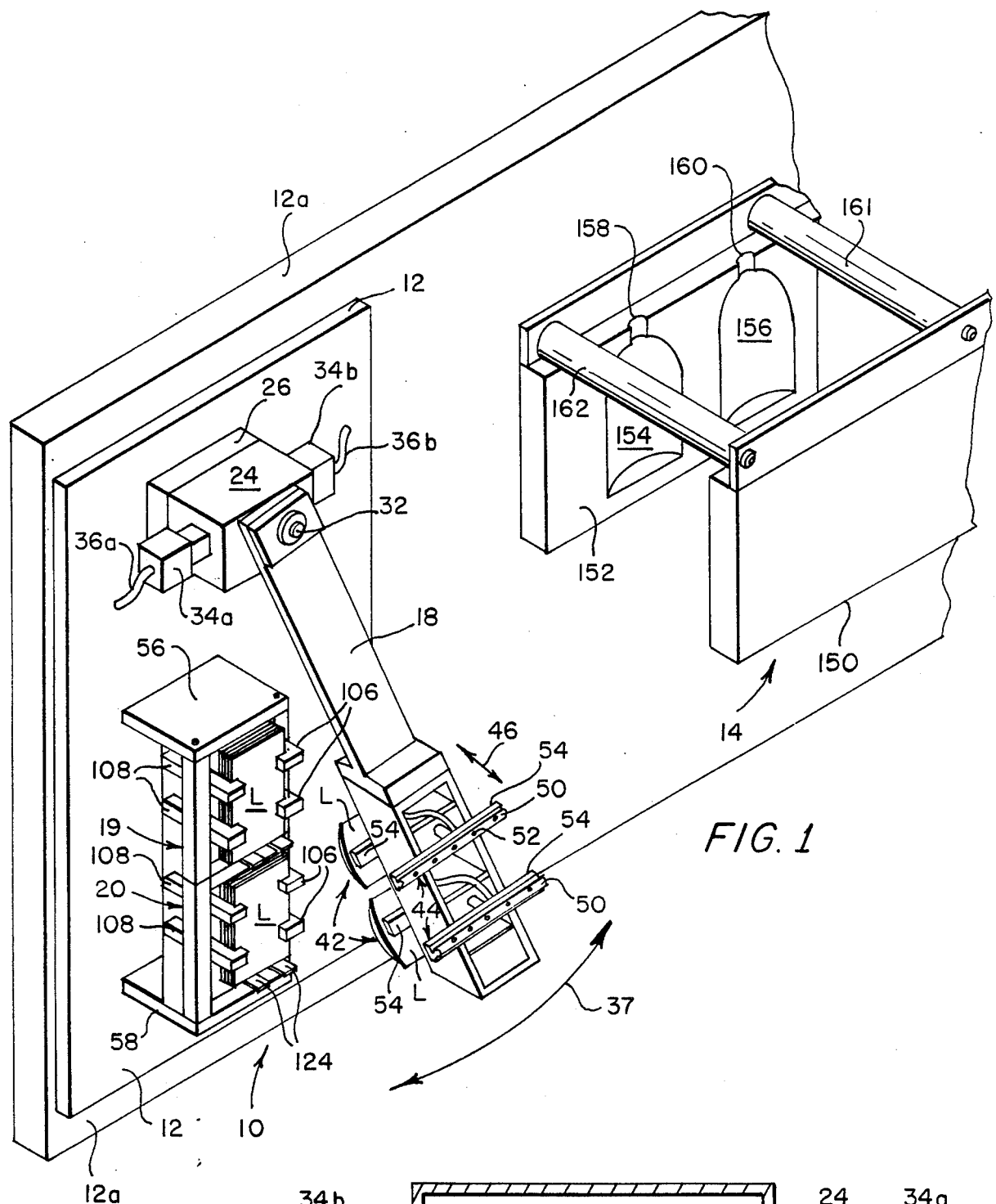
FIG. 1 is a perspective view with parts removed for clarity illustrating a label transfer apparatus that includes a label magazine, a pivotably mounted radial arm which, in turn, mounts a plurality of label transfer heads.

FIG. 1 illustrates one embodiment of a rotary arm label transfer apparatus 10 mounted on a vertical support wall 12 which is preferably separate from, but attached to the machine platten 12a. Also mounted on support wall 12 is a two-bottle molding apparatus 14. Label transfer apparatus 10 includes a label transfer device 16 rigidly mounted on one end of a pivotably mounted radial arm 18. Label transfer apparatus 10 further includes four label magazines, only two label magazines 19 and 20 being depicted.

Figure 2:
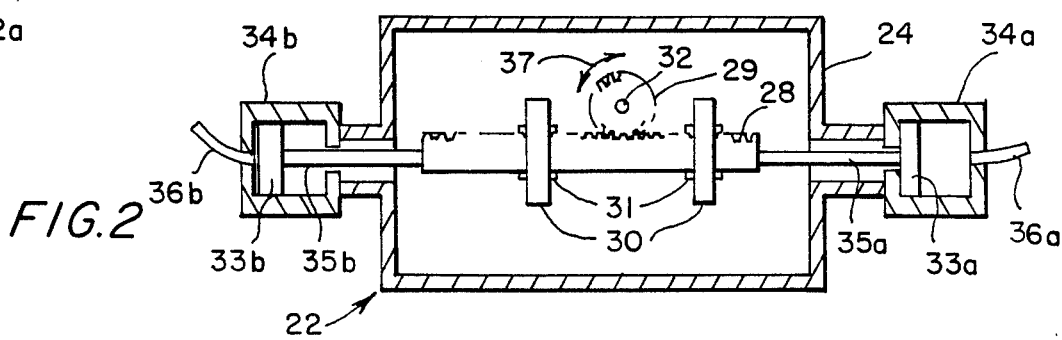
FIG. 2 is a diagrammatic, cross-sectional view of a rack and pinion radial arm pivoting means.

As shown in FIGS. 1 and 2, radial arm 18 is pivotably mounted and pivoted by a rotary actuator 22. Rotary actuator 22 comprises a housing 24 mounted onto a base 26 which in turn is mounted onto support wall 12. The width of base 26 is selected so as to properly position radial arm 18 and its plane of swing at the proper transverse distance. Rotary actuator 22 is comprised of a toothed rack 28 in meshing, driving engagement with a pinion 29. Rack 28 is mounted to housing 24 with two spaced apart mounting blocks 30 which have corresponding slide bearings 31 that support rack 28. Pinion 29 is rigidly mounted to and rotatably drives radial arm 18 by a shaft 32. Thus, when rack 28 is longitudinally moved, pinion 29 is rotated thereby and, in turn, pivots radial arm 18.

Rack 28 is longitudinally positioned by two fluid actuated pistons 33a and 33b mounted inside corresponding cylinders 34a and 34b and connected to corresponding ends of rack 28 with piston rods 35a and 35b. Pressurized fluid or electricity is supplied to the appropriate cylinder while the other cylinder is vented with fluid conduits 36a and 36b. Preferably, pistons 33a and 33b are driven by pressurized air, however, they can also be hydraulic pistons operated by hydraulic oil.

An arrow 37 in FIGS. 1 and 2 depict the motion and direction at pinion 29 and hence label transfer device 16 and radial arm 18 are driven when rack 28 is moved in the longitudinal direction. Arrows 37 also define a first plane of movement which, in FIG. 1, is shown parallel to support wall 12. However, as would be obvious, by using a wedge shaped base 26, the plane of motion indicated by arrows 37 can be at an angle with respect to wall 12, thereby providing design flexibility. Generally, however, an orthogonal system is desired for both simplicity and for permitting apparatus 10 to be retrofitted for use with installed molding apparatus 14 having a predetermined orientation.

Figure 4:
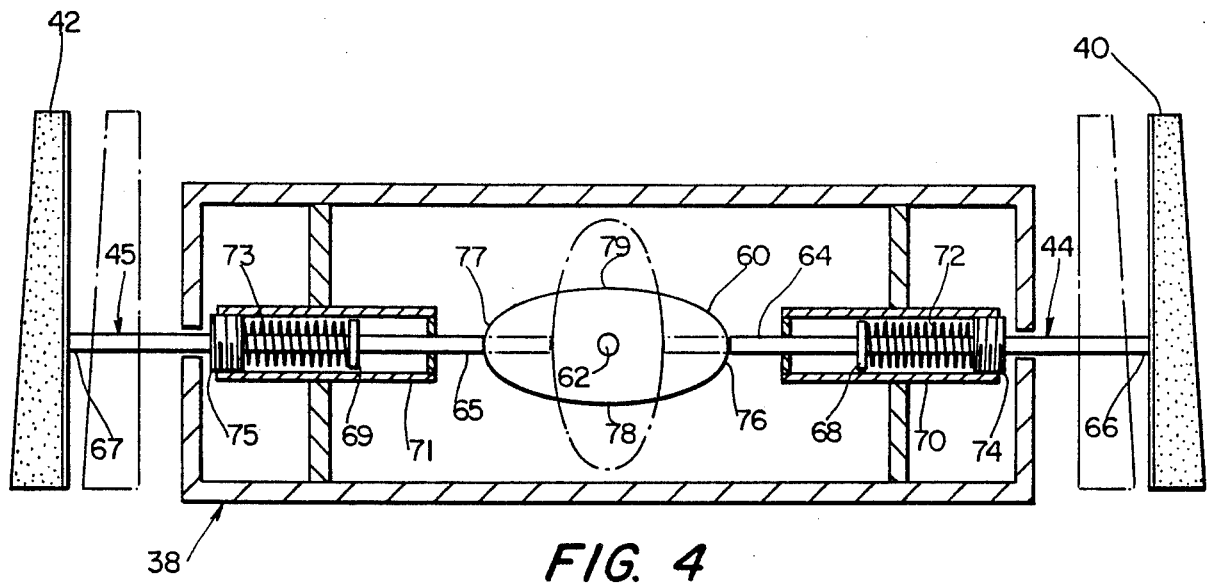
FIG. 4 is a diagrammatic, cross-sectional view of a cam actuated transfer head positioning means.

Label transfer device 16 is comprised of a housing or frame 38 onto which two pairs of oppositely opposed transfer heads 40 and 42 are mounted with rods 44 and 45, respectively (see also FIG. 4). Heads 40 and 42 are movable in mutually parallel directions that are perpendicular to the direction of movement of radial arm 18, which as shown by arrow 46 is in the transverse direction in FIG. 1.

Transfer heads 40 and 42 may comprise a rigid plastic pad 50 having a plurality of orifices 52 aligned in a row and extending therethrough to a plenum (not shown) located between the back surface of pad 50 and a backing plate 54. A vacuum tube 56 is connected to the rear of backing plate 54 and communicates through an orifice therein (not shown) with the aforementioned plenum.

It has been found that transfer heads 40 and 42 are effective for transferring a label L (shown attached to transfer heads 42) that has a length greater than the width of pad 50 so that the edges of label L can curl around pad 50. Preferably, a label L to be transferred by heads 40 and 42 is relatively thin and flexible, and thus has a very light weight.

Figure 6:
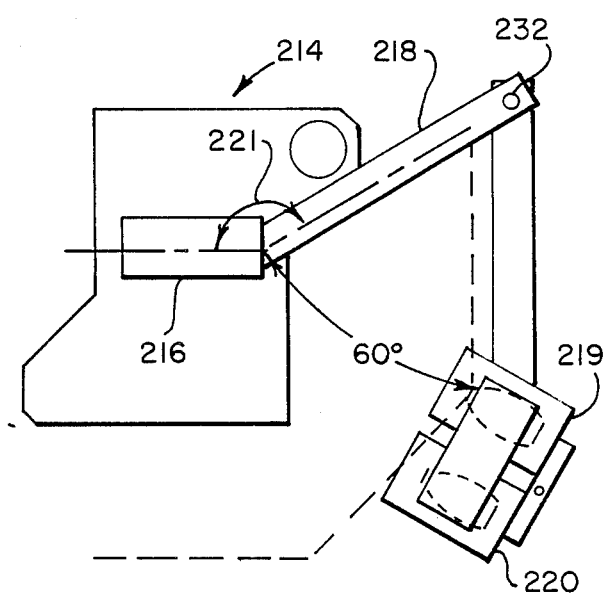
FIG. 6 is a diagrammatic positional illustration of a second embodiment of a rotary arm label transfer apparatus.

Magazines 19 and 20 are depicted in FIG. 1 as being oriented in a vertical plane. However, magazines 19 and 20 can be oriented in any appropriate plane depending upon the space availability around molding apparatus 14. Furthermore, magazines 19 and 20 can be oriented in a rotated, non-orthogonal orientation where the label pickup station is desired to be moved or where transfer device 16 is not collinear with radial arm 18 (as depicted in FIG. 6). Magazines 19 and 20 can be either independently mounted to support wall 12, or as depicted in FIG. 1, can be attached to one another along their interior edges and separately mounted to support wall 12 with mounting plates 56 and 58. Stacks of labels L are stored in magazines 19 and 20 and are fed thereby with means described in greater detail hereinbelow.

One type of mounting and moving means usuable with the present invention for transfer heads 40 and 42 is depicted in FIG. 4. Rotatably mounted inside frame 38 is an oblong-shaped or racetrack shaped cam 60 rigidly attached to a shaft 62. Cam 60 is rotated by any type of means, such as a power servo motor, a rotary electrical motor, a stepping motor or a rotary actuator, any one of which can be driven by pneumatics, hydraulics, electricity, solid state electronic devices or turbines.

As can be clearly seen in FIG. 4, transfer heads 40 and 42, mounted on their respective rods 44 and 45 are rigidly, colinearly mounted inside frame 38. Proximal ends 64 and 65 of rods 44 and 45 engage cam 60 and ride along the outer surface thereof. Thus, proximal ends 64 and 65 serve as cam followers. The distal ends 66 and 67 are rigidly, removably mounted onto heads 40 and 42, respectively, with means such as bolts (not shown). Rigidly mounted to respective mid portions of rods 44 and 45 are disks 68 and 69 and mounted around the disks 68 and 69 and the mid portions of rods 44 and 45 are respective cylinders 70 and 71. Coil springs 72 and 73, mounted inside cylinders 70 and 71 around rods 44 and 45, respectively, extend between removable slide bearing end plugs 74 and 75 and disks 68 and 69, respectively. Thus, rods 44 and 45 are slidably, resiliently mounted inside cylinders 70 and 71, respectively, in cam following engagement with respective ends of cam 60.

Cam 60 has a shape that provides two maximum points or lobes 76 and 77 and two minimum cam lobes 78 and 79 such that as cam 60 is rotated, rods 44 and 45 are alternately at their outermost, label pickup position (indicated by solid lines in FIG. 2) and their retracted, innermost position (indicated by dashed lines in FIG. 2). As a result of the shape of cam 60 pickup heads 40 and 42 have a rapid rate of retraction.

Figure 5:
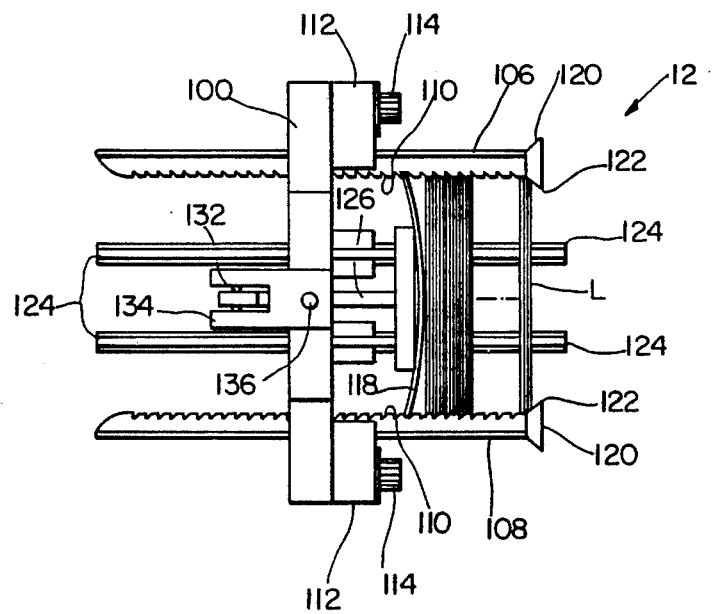
FIG. 5 is a top plan view of the label magazine.

Referring now to FIGS. 1 and 5, there is shown one type of magazine 19 which can be used with the present invention. Magazine 19 is comprised of a sturdy, rigid metal bar frame 100 that has an annular generally rectangular shape. The shape of frame 100 provides for greater flexibility in orientation and location. In addition, as shown in FIG. 1, the frame of magazine 19 can be rigidly attached to the frame of magazine 20.

Mounted onto magazine frame 100 is a label feeding means that positively supplies labels L so that the outermost label is always in approximately the same position, on the one hand, and yet the label is rigidly held at that position when transfer head 40 or 42 comes into contact therewith. The label feeding means is comprised of two pairs of two spaced apart bars 106 and 108, each bar 106 and 108 having a plurality of ratchet teeth 110 mounted on the inwardly facing surfaces thereof. Bars 106 and 108 are mounted to individual mounting blocks 112 which in turn, are removably, rigidly mounted onto frame 100 with screws 114. Mounting block 112 can be mounted with any one of a plurality of holes 116 provided in frame 100 along the periphery thereof. In this way, different shaped and sized labels can be accommodated with a single size magazine frame 100. The label feeding means further includes a flexible label backing plate or pad 118 which is preferably made of a rigid plastic material so that labels L will not be cut or ratchet teeth 110 worn too quickly. Plate 118 is preferably curved and has is relatively thin at the transverse edges so that they can be engaged by ratchet teeth 110. Bars 106 and 108 with their ratchet teeth 110 and plate 118 together comprise a ratchet mechanism for feeding labels to a label supply location.

Rigidly mounted to the end of each bar 106 or 108 of magazine 19 is a retaining finger 120 that has an inwardly projecting tip 122. Finger 120 is rigidly mounted to the end of the respective bar 106 or 108 by means such as being welded or attached with screws. Tip 122 preferably has an inclined surface with an angle that will retain the outermost label, on the one hand, yet will release it to a transfer head, on the other hand. Mounted to the bottom of frame 100 are a pair of support members 124. Support members 124 preferably have a smooth upper surface for supporting the bottom of labels L while still permitting the labels L to slide therealong.

Label backing plate 118 is resiliently urged in a forward, outward direction by a spring means which comprises of a pivotally mounted arm 126 having a bend therein and a coil spring (not shown) mounted between the bottom surface of the top of frame 100 and a point near the bend. Arm 126 is mounted at its upper end with a pivot pin 132 to a mounting block 134, which in turn, is rigidly mounted with means, such as a screw 136 to the top of frame 100. The other end of spring arm 126 is mounted to the back of plate 118 by means which permit low friction linear movement of plate 118 relative to the arcurate movement of arm 126.

Referring to FIG. 1, molding apparatus 14 will be briefly described so as to provide a better understanding of the operation of the present invention, although molding apparatus 14 does not form a part of the present invention and the one depicted is exemplary only.

Molding apparatus 14 comprises two mold halves 150 and 152. Each mold half 150 or 152 has two mold cavities 154 and 156. An orifice 158 and 160 connects the corresponding mold cavity 154 and 156 with a supply of pressurized air which is used during the blow molding operation. Mold halves 150 and 152 are slidably mounted on support bars 162 and 164, one end of which can be connected to support wall 12 for supporting molding apparatus 14. Power means (not shown) are provided for opening and closing mold halves 150 and 152. In addition, molding apparatus 14 includes numerous other pipes, conveying apparatus to convey parisons to the molds and molded objects from the mold, and instrumentation (all of which has been omitted for clarity).

Figure 3:
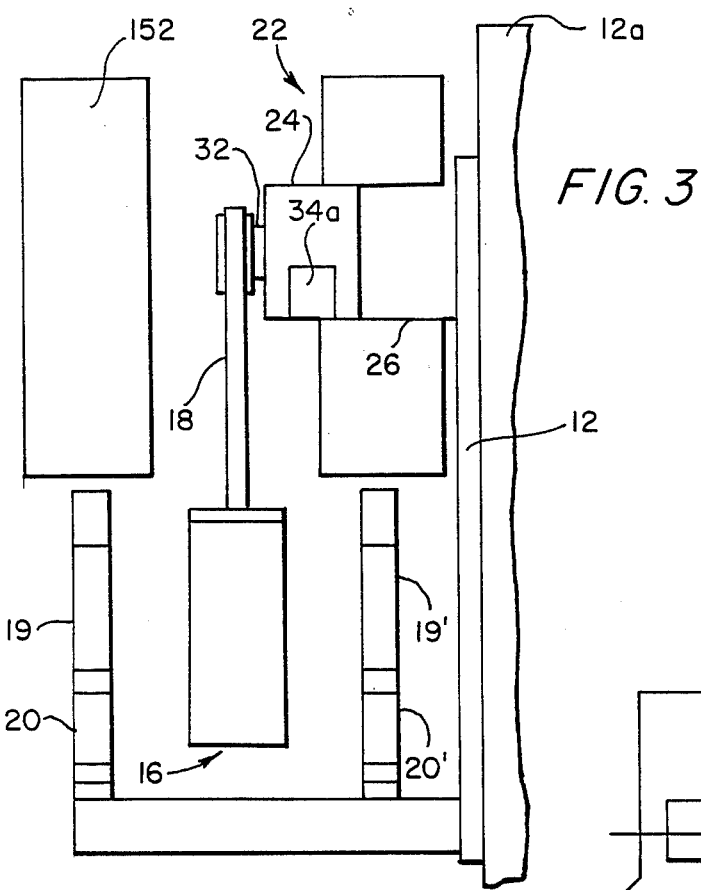
FIG. 3 is a diagrammatic, positional illustration of the label transfer device, the label storing magazines, and the mold halves.

With reference now to FIG. 6, a second embodiment of a rotary arm label transfer apparatus 200 is shown in diagramtic form. Label transfer apparatus 200 transfers labels to a molding apparatus 214 and supplies the labels to an interior mold cavity (not shown). Label transfer apparatus 200 comprises a label transfer device 216 rigidly mounted at one end of a radial arm 218. The other end of radial arm 218 is pivotably mounted and is pivotably driven by a shaft 232. However, whereas label transfer device 16 is collinearly aligned and mounted on one end of radial arm 18, as clearly shown in FIG. 3, label transfer device 216 is rigidly mounted at an angle to one end of radial arm 218. In the embodiment of FIG. 6, because of limitations in movement, radial arm 218 can pivot only through an angle of 60° instead of the 90° through which radial arm 18 pivots. Therefore, in order to properly position a label in the mold cavity of a vertically aligned molding apparatus 214, it is necessary to attach label transfer device 216 at an angle with respect to radial arm 218. The inside angle of attachment indicated by arrow 221 is the complement of the angle of rotation through which radial arm 218 travels. Therefore, for a travel of 60° for radial arm 218, label transfer device 216 must be rigidly attached so as to form an angle shown by arrow 221 that is 120°. As mentioned above, label magazines 219 and 220 will also have to be reoriented in order to properly present a label to transfer device 216.

In the embodiment in FIG. 6, the pivot point or location of shaft 232 is at least as high as the mold cavity of molding apparatus 214. In the embodiment of FIG. 1, the pivot point of radial arm 18 is horizontally opposite the deposit point in mold cavity 154 and 156. However, because of the reduced arc of travel of radial arm 218, the pivot point and shaft 232 of radial arm 218 must be located above the mold cavity of molding apparatus 214. However, it is noted that label transfer device 216 still enters the space between the spaced apart mold halves from the bottom.

Figure 7:
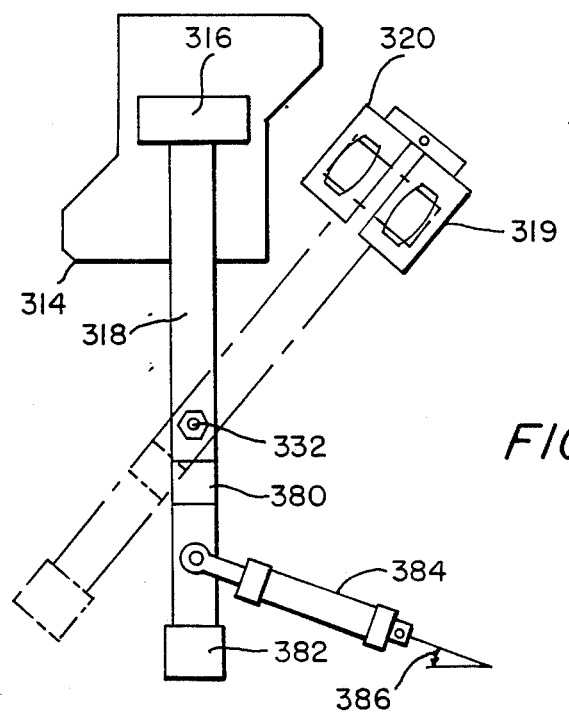
FIG. 7 is a diagrammatic positional illustration of still another embodiment of a rotary arm label transfer apparatus.

Yet another embodiment of the present invention is depicted in FIG. 7. A label transfer apparatus 300 for depositing a label to a molding apparatus 314 comprises of a radial arm 318 pivotable between molding apparatus 314 and magazines 319 and 320.

It will be apparent that in any of the embodiments, the angle of movement of the arm and the location of the pivot can be varied to accomodate the different motions and locations of the arm and magazine to adapt to the various types of molding machines.

Unlike radial arms 18 and 218, radial arm 318 is mounted at a mid portion thereof by a shaft 332. Radial arm 318 is also provided with 30° bend 380 just below the pivot point and a counterweight 382 at one end. At the other end of radial arm 318 a label transfer device 316 is mounted.

Radial arm 318 is rotated by a linear extension actuator 384 oriented 20° above the horizontal as shown by arrow 386.

Returning now to FIG. 1, the operation of label transfer apparatus 10 will be described in general terms. However, it is to be appreciated that with obvious differences, the operation of label transfer apparatuses 200 and 300 will be similar.

Label transfer device 16 is initially positioned by radial arm 18 in a first vertical orientation so that transfer heads 40 and 42 are in transverse alignment with magazines 19 and 20. Cam 60 (FIG. 4) is activated causing rods 44 and 45 to be resiliently extended outwardly in the transverse direction, which is perpendicular to the direction of movement of transfer device 18. At the same time, a vacuum is applied to pickup heads 40 and 42 as the heads move transversely outwardly and into engagement with the uppermost label L. As soon as contact is made, further outward movement of heads 40 and 42 is resisted as a result of the ratchet mechanism of magazines 12 and 14. This provides a firm contact between the outer surface of heads 40 and 42 and the outermost label L. As cam 60 continues to turn, springs 72 and 74 will rapidly return heads 40 and 42 to their respective withdrawn positions taking with them the corresponding labels now securely attached to the outer surfaces of the heads. Air is then emitted through fluid line 366 to cause piston 366 to move to the right as shown in FIG. 2, thereby similarly causing rack 28 to move to the right and to rotate pinion 29. The rotation of pinion 29 causes radial arm 18 to be pivoted in the counter-clockwise direction (as shown in FIG. 1) toward a distal location where molding apparatus 14 is located. While device 16 is being positioned, cam 60 continues to rotate and the pickup heads 40 and 42 begin to move in the transverse outwardly directions. With proper timing and transverse distances properly selected, transfer device 16 will enter the space between mold halves 150 and 152 at exactly the correct time as transfer heads 40 and 42 are being moved in the outward direction so as to minimize the amount of time that device 16 is between the two mold halves. When heads 40 and 42 have been extended to their full outward position, they will be in contact with the inner surfaces of the mold halves. At that time, the vacuum being supplied to heads 40 and 42 is terminated and vacuum is applied to the mold halves so as to retain the labels therein. Cam 60 continues to turn and with proper timing, after the label transfer, heads 40 and 42 are again rapidly withdrawn. Simultaneously, pressurized air is admitted to fluid line 36a while fluid line 36b is vented. This causes rack 31 to be driven in the lefthand direction and transfer device 16 to be again positioned in front of magazines 19 and 20. The mold halves can then be closed and the molding process begun.

It will be understood that these improvements in label applicator heads are applicable to any of the label transfer apparatus described in the prior art apparatuses.

The operation of the various embodiments have either been discussed during the description of the respective embodiments or will be apparent therefrom.

Although the invention has been described with respect to specific embodiments, it will be apparent that the invention is capable of numerous modifications and variations without departing from the spirit and scope of the invention.

We claim:

1. An apparatus comprising, in combination:
   a stationary base,
   a radial arm mounted to the base, means for pivoting said arm about an axis which is fixed with respect to the base, said arm being pivotally movable about said fixed pivot axis between a first radial position and a second radial position, said two positions defining a plane,
   a molding apparatus mounted on the base and comprising opposed mould cavities which move, relative to each other, in a direction substantially perpendicular to said plane against each other to form a closed mould cavity and away from each other to open the mould cavity,
   and a label transfer means mounted on said arm and movable therewith for picking up a label at said first position, for retaining said label during transport to said second position and for depositing the label into the mould cavity at said second position, said label transfer means comprising at least one label transfer head, mounting means for mounting said label transfer head on the arm for reciprocal movement in a direction substantially perpendicular to said plane, such that the label transfer head moves substantially perpendicular to said plane at the first position to pick up a label and substantially perpendicular to said plane at the mould cavity to deposit the label into said mould cavity.

2. An apparatus as claimed in claim 1 wherein said mounting means mounts said label transfer means at a first end of said arm.

3. An apparatus as claimed in claim 2 wherein said arm is pivotably mounted at a second end thereof.

4. An apparatus as claimed in claim 2 wherein said label transfer means is rigidly mounted substantially colinearly with said arm.

5. An apparatus as claimed in claim 2 wherein said label transfer means is rigidly mounted at an angle to said arm.

6. An apparatus as claimed in claim 1 wherein said transfer head is moved rectilinearly.

7. An apparatus as claimed in claim 6 wherein said label transfer means further comprises a second label transfer head mounted for rectilinear, reciprocal movement opposite to said one label transfer head.

8. An apparatus as claimed in claim 1 wherein said pivoting means comprises a fluid actuated extensible member.

9. An apparatus as claimed in claim 8 wherein said pivoting means further includes a rack and pinion, said rack being reciprocally driven by said extensible member and said pinion being rigidly connected to said arm.

10. An apparatus as claimed in claim 1 and further including a label magazine located at said first position for supplying an outermost label of a stored stack of labels for pickup by said head.

11. An apparatus as claimed in claim 1 and further including pivotal mounting means for mounting said arm such that said arm is substantially vertical when at said first position and is substantially horizontal when at said second position.

12. An apparatus as claimed in claim 1 wherein the pivot axis of said arm is horizontally spaced from the mold cavity and is at substantially the same height therewith.

13. An apparatus as claimed in claim 1 wherein said apparatus includes means for applying a label in each mold half cavity when the mold halves are spaced apart.

14. An apparatus as claimed in claim 1 wherein said arm is pivoted to enter the space between the mold halves from below the mold halves.

* * * * *